United States Patent [19]
Siegel et al.

[11] Patent Number: 5,540,617
[45] Date of Patent: Jul. 30, 1996

[54] FILTER ARRANGEMENT CONSISTING OF AT LEAST TWO FILTERS WHICH CAN BE FLOWED THROUGH ONE AFTER THE OTHER

[75] Inventors: Gunter Siegel, Horb; Juergen Heuberger, Pliezhausen, both of Germany

[73] Assignee: Mercedes-Benz AG, Stuttgart, Germany

[21] Appl. No.: 301,050

[22] Filed: Sep. 6, 1994

[30] Foreign Application Priority Data

Sep. 3, 1993 [DE] Germany ............... 43 29 737.4

[51] Int. Cl.[6] ............................................ B60H 3/06
[52] U.S. Cl. ........................... 454/158; 55/309; 55/485
[58] Field of Search ..................... 55/309, 315, 318, 55/328, 482, 485; 454/158

[56] References Cited

U.S. PATENT DOCUMENTS 3,086,342  4/1963  Goettl ..................... 55/328 X
4,684,381  8/1987  Wasylyniuk ............. 454/158 X

FOREIGN PATENT DOCUMENTS 291072   11/1988  European Pat. Off. ....... 454/158
2833374  2/1980   Germany ................... 454/158
3716243  11/1988  Germany .
3802356  8/1989   Germany .
1449364  1/1989   U.S.S.R. ................... 454/158

*Primary Examiner*—Harold Joyce
*Attorney, Agent, or Firm*—Evenson, McKeown, Edwards & Lenahan

[57] ABSTRACT

A filter arrangement of a heating or air-conditioning system in a motor vehicle consists of at least two filters which can be flowed through one after the other. Non-confusable filter exchange is achieved with the filters having different external dimensions and their reception locations having reception sizes assigned to the respective external dimensions so that each reception location is only able to receive a predetermined filter.

16 Claims, 3 Drawing Sheets

FILTER ARRANGEMENT CONSISTING OF AT LEAST TWO FILTERS WHICH CAN BE FLOWED THROUGH ONE AFTER THE OTHER

BACKGROUND AND SUMMARY OF THE INVENTION

The invention relates to a filter arrangement of a heating or air-conditioning system in a motor vehicle consisting of at least two filters which can be flowed through one after the other.

A filter arrangement of this type, which consists of three filters disposes one behind the other and is combined to form a construction unit, is known from German Patent Document DE 3,802,356 A1. If, in this case, the capacity of one of the filters has been reached, the entire construction unit has to be exchanged. This system incurs high costs, in particular in the case of highly effective pollutant filters, such as chemical absorption filters and activated carbon filters, which, by experience, have a longer service life than an upstream paper dust filter.

An object of the invention is to provide a filter arrangement which allows a specific exchange of individual filters to be carried out, for example in accordance with a servicing schedule, in conjunction with a non-confusable assembly possibility which guarantees a high degree of functional reliability even in the case of difficult installation conditions which cannot be viewed directly by servicing personnel.

This object is achieved according to preferred embodiments by providing a filter arrangement of a heating or air-conditioning system in a motor vehicle consisting of at least two filters which can be flowed through one after the other, the filters having different external dimensions and their reception locations having reception sizes assigned to the external dimensions so that each reception location is only able to receive a predetermined filter, wherein external dimensions of the filters decrease in the throughflow direction, wherein a first of the filters, which has the shortest service life, has the largest external dimensions and is located nearest to a filter exchange access, and wherein further of the filters, which have respective smaller external dimensions, are exchangeable respectively after removal of an upstream one of the filters with the next larger external dimensions.

A filter arrangement according to the invention which takes practical conditions into consideration is distinguished by the fact that the external dimensions of the filters decrease in the throughflow direction and that the filter with the shortest service life has the largest external dimensions and is located nearest to an access.

In an exemplary preferred embodiment of the invention, the filter with the smaller external dimensions is exchangeable after removal of the upstream filter with the next larger external dimensions so that the installation and removal of the filter can take place from a central position.

Leakage flows which can lead to annoying dust and odor pollution are prevented if the filters are pressed against assigned filter frames with interposition of seals and with mutual support when the filter provided with the largest external dimensions is secured.

In another exemplary embodiment of the invention, each filter is received by a reception pocket and can be removed and inserted separately in each case.

In a further design of the invention, the filter with the largest external dimensions is a dust filter which, by experience, is spent more quickly than downstream pollutant filters.

The service life of filters arranged downstream of a first filter is increased if the filter with the largest external dimensions can be pivoted away from the following filter and the edge side of this filter located opposite the pivot axis exposes a bypass opening in the pivoted-away state with continued filter throughflow.

Other objects, advantages and novel features of the present invention will become apparent from the following detailed description of the invention when considered in conjunction with the accompanying drawings.

DETAILED DESCRIPTION OF THE PREFERRED EMBODIMENTS

Figure 1:
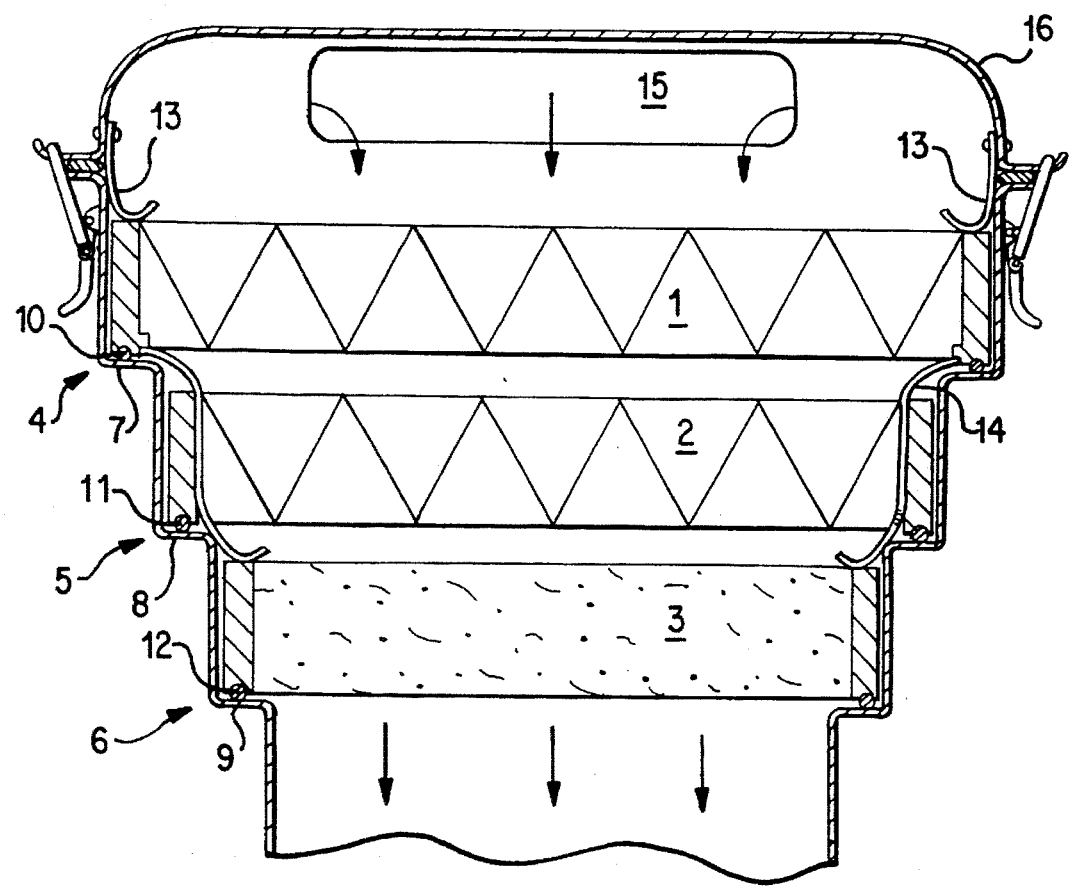
FIG. 1 is a sectional schematic view which shows a filter arrangement constructed according to a preferred embodiment of the invention which can be flowed through from the top to the bottom with filter exchange to be carried out from the top.

The filter arrangement illustrated in FIG. 1 consists of three filters 1, 2 and 3 which can be flowed through one after the other. The filter 1 initially acted upon is designed as a paper filter for retaining dust and pollen. The following filter 2 is likewise formed by a paper filter which, owing to a chemical impregnation, is capable of retaining odorous substances and pollutants. The filter 2 forms a preliminary filter in relation to the downstream filter 3 which has a bulk of activated carbon, the large active surface being capable of binding traces of odorous substances and pollutants which have still passed through the filter 2.

According to the illustrations, the filter arrangement is flowed through from the top to the bottom. In the case of a reversed filter arrangement, throughflow from the bottom to the top would also be possible. In this case, the selection of the throughflow direction depends on the local conditions, in particular in respect of accessibility of the filter arrangement for exchanging individual filters.

The filters 1, 2 and 3 have different external dimensions and their reception locations 4, 5 and 6 have reception sizes adapted to the external dimensions, such that each reception location 4; 5; 6 is capable of receiving only one predetermined filter 1; 2; 3. It is thus reliably avoided, even in the case of an application location which cannot be seen into, that a filter with a non-fitting construction is inserted. The external dimensions of the filters 1, 2 and 3 decrease in the throughflow direction, such that the dust filter 2, which is acted upon in a particularly intensive manner, has a large surface and thus has a longer service life.

The reception locations 4, 5 and 6 for the filters 1, 2 and 3 are designed in the exemplary embodiment according to FIG. 1 as filter frames 7, 8 and 9 against which the respectively assigned filter 1 or 2 or 3 is pressed with interposition of a seal 10 or 11 or 12 respectively. If the dead weight of the filters 1, 2 and 3 is not sufficient to produce a satisfactory sealing effect, pressing-on springs 13, 14 are provided, by means of which, when a cap 16 provided with an air inlet opening 15 is fitted on, the pressing-on force produced is passed on to the filter 3. As shown in FIG. 1, the springs 14 may extend from the largest filter 1 to the smallest filter 3.

To exchange the filter, the cap 16 is firstly removed, as a result of which direct access to the filter 1 is provided, which filter is always exchanged after a predetermined mileage of the motor vehicle. By experience, with every second exchange, the filter 2 is also exchanged additionally, whereas the filter 3 has to be replaced, for example only with every sixth exchange, which has a favorable effect on the service life of the seal 9. The sealing effect of this seal 9 must be guaranteed primarily since, in the case of air which is severely polluted with odorous substances, small leakages can already lead to unpleasant odor pollution.

Figure 2:
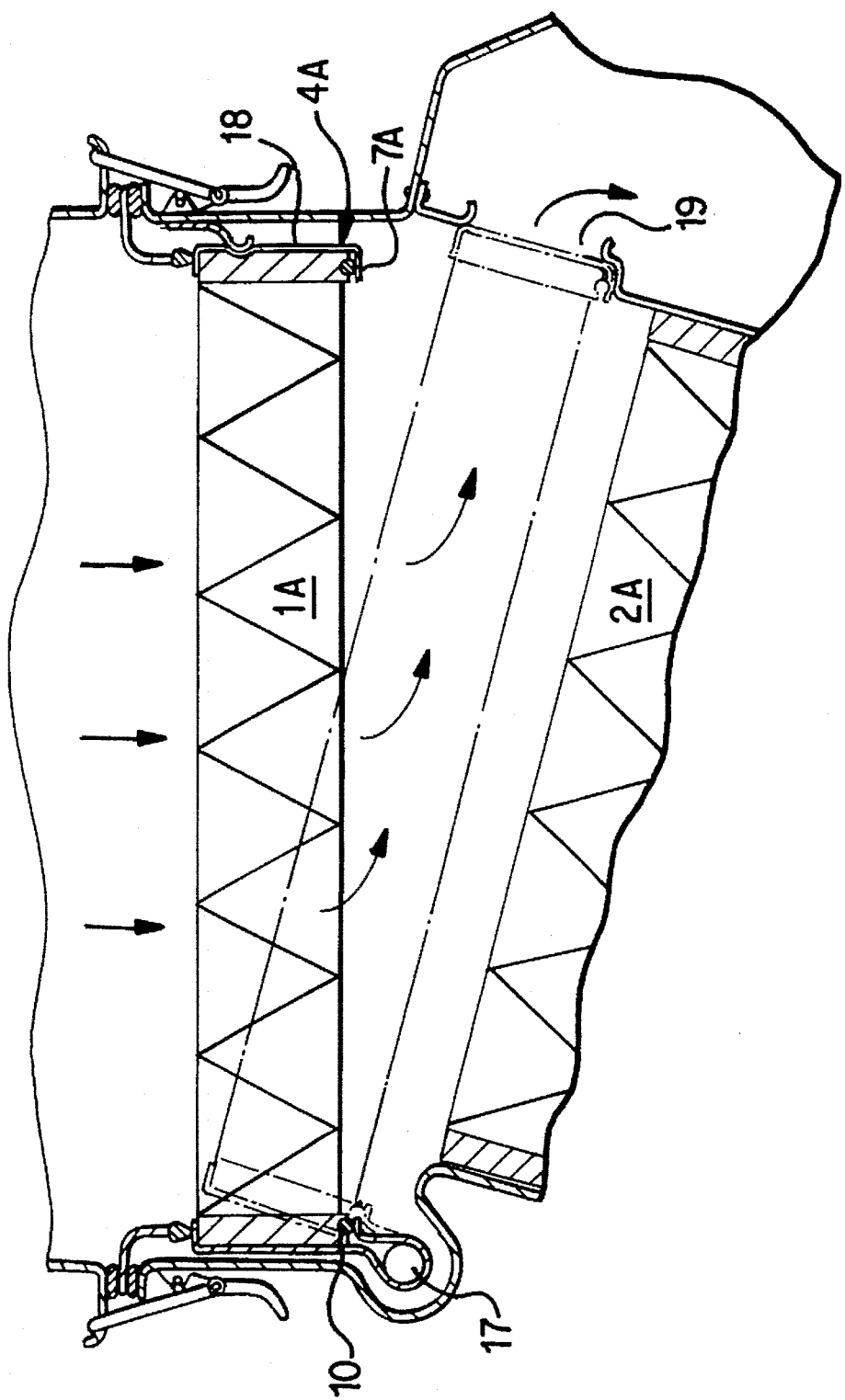
FIG. 2 is a sectional schematic partial view which shows a filter arrangement constructed according to a second preferred embodiment of the invention, in which the filter initially flowed against can be pivoted into a position which covers a bypass opening.

In the exemplary embodiment according to FIG. 2, the filter 1A acted upon initially can be pivoted about a pivot axis 17. In the secured, pivoted-out position of the filter 1A, shown by continuous lines, the edge side 18 of the filter 1A located opposite the pivot axis 17 exposes a bypass opening 19 by means of which, in the case of air which is free from odorous and pollutant substances, the downstream filters can be bypassed, thus resulting in an increased service life thereof. If the filter 1A is pivoted into its position indicated by dot/dashed lines, the edge side 18 covers the bypass opening 19 with continued throughflow of the filter 1A, such that the downstream filters are acted upon.

The embodiment of FIG. 2 is otherwise similar to FIG. 1, with suffix "A" added to the shown drawing reference numerals corresponding to similar reference numerals of FIG. 1.

Figure 3:
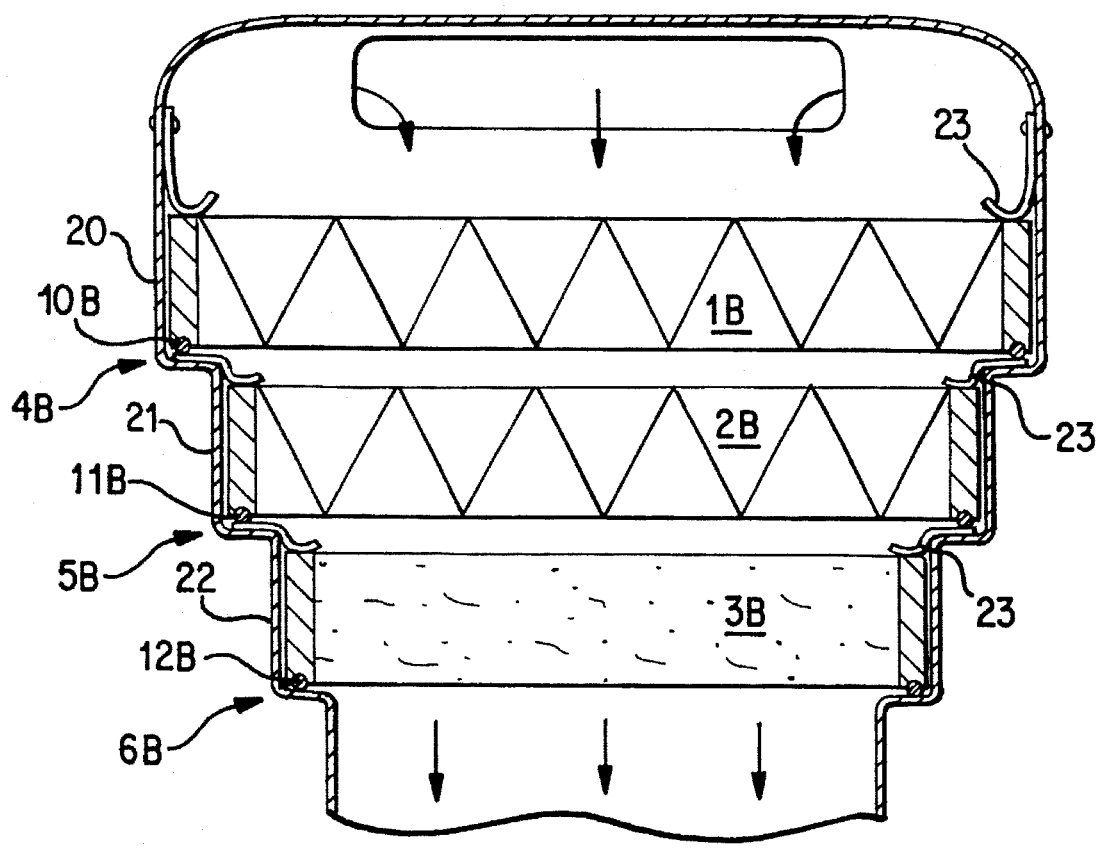
FIG. 3 is a sectional schematic view which shows a filter arrangement constructed according to a third preferred embodiment of the invention, which can likewise be flowed through from the top to the bottom with individually removable filters.

The exemplary embodiment according to FIG. 3 differs from that according to FIG. 1 due to the fact that the reception locations 4B, 5B and 6B for the filters 1B, 2B and 3B are designed as reception pockets 20, 21 and 22, which allows specific removal of a single one of the filters 1B, 2B or 3B designed in the manner of drawers. Pressing-on springs 23 ensure a sealing contact of the seals 10B, 11B and 12B when the non-confusable filter 1B, 2B or 3B is inserted.

The embodiment of FIG. 3 is otherwise similar to FIG. 1, with suffix "B" added to the shown drawing reference numerals corresponding to similar reference numerals of FIG. 1.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Filter arrangement of a heating or air-conditioning system in a motor vehicle comprising:

at least two filters, each of said filters having a different peripheral dimension;

a filter housing having supports configured to receive respective said at least two filters, each of said supports corresponding to a respective said filter and each of said supports having a supporting area which corresponds to a respective said peripheral dimension, said filter housing having an inlet end and an outlet end, said filters and said corresponding supports being arranged in an order of decreasing peripheral dimension from said inlet end to said outlet end such that a largest of said filters is arranged toward said inlet end, and said supports being configured such that said filters are insertable into said filter housing and removable from said filter housing through said inlet end; and a bypass outlet arranged at one side of said largest filter, wherein a pivotal connection for said largest filter is arranged at a side of said largest filter opposite said one side, said bypass outlet and said pivotal connection being configured such that said largest filter is pivotable from a non-bypass position in which said bypass outlet is closed to a bypass position in which said bypass outlet is open.

2. Filter arrangement according to claim 1, wherein the filters are pressed against respective said supports with interposition of seals and with mutual support when the largest filter is secured.

3. Filter arrangement according to claim 1, wherein the largest filter is a dust filter.

4. Filter arrangement according to claim 2, wherein the largest filter is a dust filter.

5. Filter arrangement according to claim 1, further comprising a spring carried by one of said filters which in an installed in-use position resiliently engages another of said filters.

6. Filter arrangement according to claim 1, further comprising a spring carried by the largest filter which in an installed in-use position extends to engage a smallest of the filters.

7. Filter arrangement according to claim 1, wherein said largest filter has the shortest service life and is located nearest to a filter exchange access, and wherein further of the filters are exchangeable respectively after removal of an upstream one of the filters.

8. Filter arrangement according to claim 7, wherein the filters are pressed against respective said supports with interposition of seals and with mutual support when the largest filter is secured.

9. Filter arrangement according to claim 7, wherein the largest filter is a dust filter.

10. Filter arrangement according to claim 8, wherein the largest filter is a dust filter.

11. Filter arrangement according to claim 7, wherein a spring is provided which is carried by one of said filters, which spring in use resiliently engages another of said filters.

12. Filter arrangement according to claim 11, wherein said spring is carried by the largest filter and extends to engage a smallest of the filters when in an installed in-use position.

13. Filter arrangement according to claim 1, further comprising a housing cover arranged at said inlet end, said housing cover configured to close said inlet end.

14. Filter arrangement according to claim 1, wherein said supports comprise a step-shaped cross-section.

15. Filter arrangement according to claim 1, wherein said largest filter pivots toward said inlet end when pivoting from said non-bypass position to said bypass position.

16. Filter arrangement according to claim 1, wherein said bypass outlet and said pivotal connection are configured such that in said bypass position, a fluid flowing into said filter housing through said inlet end flows through said largest filter and at least part of said fluid bypasses other of said filters by flowing out of said filter housing through said bypass outlet.

\* \* \* \* \*